(12) United States Patent
McNeil (10) Patent No.: US 12,285,026 B1
(45) Date of Patent: Apr. 29, 2025

(54) CONFECTIONS THAT RISE AND FALL IN A CARBONATED BEVERAGE AND METHODS AND EQUIPMENT FOR PRODUCTION THEREOF

(71) Applicant: Stacy Ann McNeil, Eureka, CA (US)

(72) Inventor: Stacy Ann McNeil, Eureka, CA (US)

( * ) Notice: Subject to any disclaimer, the term of this patent is extended or adjusted under 35 U.S.C. 154(b) by 614 days.

(21) Appl. No.: 16/435,401

(22) Filed: Jun. 7, 2019

Related U.S. Application Data (63) Continuation-in-part of application No. 15/935,967, filed on Mar. 26, 2018, now abandoned.

(51) Int. Cl.
| | | |
|---|---|---|
| *A23G 3/52* | (2006.01) | |
| *A23G 3/02* | (2006.01) | |
| *A23L 2/54* | (2006.01) | |

(52) U.S. Cl.
CPC ............. *A23G 3/52* (2013.01); *A23G 3/0215* (2013.01); *A23L 2/54* (2013.01); *A23G 2220/02* (2013.01)

(58) Field of Classification Search
CPC ... A23G 1/00; A23G 3/00; A23G 3/06; A23G 2/54
See application file for complete search history.

(56) References Cited

U.S. PATENT DOCUMENTS

| | | | |
|---|---|---|---|
| 5,456,937 | A | 10/1995 | Chalupa |
| 5,620,707 | A | 4/1997 | Sanker et al. |
| 6,319,535 | B1 | 11/2001 | Shaw |
| 34,976 | A1 | 2/2006 | Cotten et al. |
| 34,351 | A1 | 2/2012 | Sridhar et al. |
| 269,927 | A1 | 10/2012 | Auld et al. |
| 45,319 | A1 | 2/2013 | Forns |
| 216,199 | A1 | 8/2015 | Porter et al. |
| 10,077,419 | B2 | 9/2018 | Hollenkamp |

FOREIGN PATENT DOCUMENTS

| | | |
|---|---|---|
| EP | 1369043 A1 | 10/2003 |
| EP | 1629722 A1 | 1/2006 |
| WO | WO-022909 A1 | 2/2009 |

OTHER PUBLICATIONS molecularrecipes.com, "Cold Oil Spherification; Sriracha Pearls", http://www.molecularrecipes.com/gelification/sriracha-pearls-cold-oil-spherification/.
Baird, Heather, "Dessert Caviar minus the Molecular Gastronomy; Cappuccino Mousse with Coffee Caviar", http://www.sprinklebakes.com/2012/07/dessert-caviar-minus-molecular.html.
Bresler, Luke, "Jack Daniels 'n Lime Gummy Treats—Cold Oil Spherification", Jun. 6, 2015, http://barelynormal.co.za/cold-oil-spherification-jack-n-lime.
Burg, James C., "Generating Yummy Gummies", May 1998, http://www.naturalproductsinsider.com/articles/1998/05/generating-yummy-gummies.aspx.
Chef Gina, "Caviar by Cold Oil Spherification", Aug. 2013, http://www.foodhighs.com/2013/08/23/caviar-by-cold-oil-spherification.
Logsdon, Jason, "Spherification Technique", http://amazingfoodmadeeasy.com/info/modernist-techniques/more/spherification-technique.
Logsdon, Jason, "Gels and Gelling", http://amazingfoodmadeeasy.com/info/modernist-techniques/more/gelification-technique.
Liger-Belair G., 2015. Bubble Dynamics in Various Commercial Sparkling Bottled Waters. J. Food Engineering. 163, 60-70.
Burey P., 2009. Confectionery Gels: A Review on Formulation, Rheological and Structural Aspects. Intl. J. of Food Properties, 12:1, 176-210.
Liger-Belair G., 2006. Modeling the Kinetics of Bubble Nucleation in Champagne and Carbonated Beverages. J. Phys. Chem., 110, 21145-21151.
Saha D., 2010. Hydrocolloids as thickening and gelling agents in food: a critical review. J. Food Sci. Technol. 47(6), 587-597.
Jones S.F., 1999. Bubble nucleation from gas cavities—a review. Advances in Colloid and Interface Sci. 80, 27-50.
Lees R. and Jackson E.B., 1973. Sugar Confectionery & Chocolate Manufacture; Gums, Jellies, and Pastilles. p. 226-268. Published by Leonard Hill. Bishopbriggs, Glasgow G64 2NZ.

*Primary Examiner* — Vera Stulii
(74) *Attorney, Agent, or Firm* — Integral Patent; Lawrence J. Shaw (57) ABSTRACT

Edible confections which repeatedly rise and sink in a carbonated beverage due to changing buoyancy resulting from a time-varying population of carbonation bubbles on the surface of the confection, and the associated equipment and processes for production. A low solubility gelatin-based "gummi" confections are preferred because the dimensions of the confections and their surface properties are relatively invariant with time, and the submerged confections have little effect on the appearance and the level of carbonation of the beverage. Aeration by whisking produces internal bubbles which lower the specific gravity. Cold old spherification of the aerated slurry creates surfaces of the formed confections which differ considerably from surfaces produced by other processes for the production of gummi candies. The process is optimized to create, over the entirety of the surface of the confection, surface regions which are rough on length scales which promote bubble nucleation interspersed with smooth regions which promotes bubble retention.

24 Claims, 5 Drawing Sheets

CONFECTIONS THAT RISE AND FALL IN A CARBONATED BEVERAGE AND METHODS AND EQUIPMENT FOR PRODUCTION THEREOF

CROSS-REFERENCE TO RELATED APPLICATIONS

This patent application is a continuation-in-part application based on and claiming priority to patent application Ser. No. 15/935,967 filed Mar. 26, 2018 by Stacy A. McNeil for "Candy spheres with novel characteristics and extended shelf life, and method of making the same." Patent application Ser. No. 15/935,967 filed Mar. 26, 2018 by Stacy A. McNeil for "Candy spheres with novel characteristics and extended shelf life, and method of making the same" is hereby incorporated by reference.

FIELD OF THE INVENTION

The present invention relates generally to toys and amusements, more particularly to edible toys and amusements with kinetic properties, and still more particularly to edible toys and amusements with kinetic properties in carbonated beverages. Furthermore, the present invention relates to confections and their manufacturing, and more particularly to confections having an attractive appearance and to confections having bulk and surface properties which will produce bobbing when submerged in a carbonated beverage due to changing buoyancy caused by bubbles attached to the surface. Furthermore, the present invention relates to methods and equipment for manufacturing the articles specified above.

BACKGROUND OF THE INVENTION

In the present specification, an article which travels up and down in a carbonated beverage due to changing buoyancy produced by the bubble population which forms on the surface will be referred to as a "rising/falling article" of "ascending/descending article." The article will initially sink in the carbonated beverage if its specific gravity is greater than unity. Then if the population of carbon dioxide bubbles which forms on the surface of the submerged article reaches a sufficient volume to make the overall density of the article/bubble ensemble less than unity, the article will rise to the top surface of the beverage. At the top surface of the beverage, bubbles which come in sufficient contact with the beverage/air interface escape into the air (which can also be referred to as the bubble collapsing at the free surface). If the article/bubble ensemble is then left with a density greater than that of the beverage it again sinks, beginning another cycle of motion.

Well-known demonstrations of the bobbing of articles in a carbonated beverage due to changing buoyancy include using raisins (see "Sink Or Swim!: The Science of Water," by Barbara Taylor, Random House Publishing, New York, 1990, page 22) or small clay balls (see "Physics For Every Kid," by Janice Pratt VanCleave, John Wiley & Sons, Inc., New York, 1991, pages 64-65). Although raisins and clay balls can adequately demonstrate the changing buoyancy effect, they leave much to be desired in terms of appearance. Furthermore, there is a problematic lack of reliability in their behavior due to variations in size, shape, density and surface characteristics. Some of the raisins and clay balls will fail to rise and stay at the bottom of the beverage, and some of the raisins and clay balls will fail to descend and stay at the top surface of the beverage.

U.S. Pat. No. 6,319,535 teaches edible confections which are thin and substantially planar, so that the conditions for ascension and descension are substantially independent of the dimensions of the confections other than their thickness. (What is referred to as "swimming" in U.S. Pat. No. 6,319,535 is referred to as "bobbing" in the present application.) As discussed in columns 9, lines 20-27, making the confections thin and substantially planar allows large confections with arbitrary perimeters to perform bobbing. However, it should be noted that U.S. Pat. No. 6,319,535 only teaches the optimization of the rising/falling motion for articles which are thin and does not address the optimization of the bobbing of articles where the width-width aspect ratios of the article are closer to unity.

U.S. Pat. No. 6,319,535 teaches that the preferred confections are gummi confections (i.e., rubbery gelatin-based candies, such as Trolli Gummi Bears distributed by GPA Incorporated of St. Louis, Mo.) because gummi confections have a low solubility and tend to maintain their density and the bubble nucleation and retention characteristics of the surface when submerged in a beverage. U.S. Pat. No. 6,319,535 also addresses aspects of the surface texture which influence the buoyancy produced by the bubbles which form on the surface of the confection when submerged in a carbonated beverage. Columns 14 and 15 of U.S. Pat. No. 6,319,535 discuss how bubbles nucleate at a surface or in the bulk of a carbonated beverage due to random fluctuations in the spatial distribution of the dissolved carbon dioxide. Bubbles tend to nucleate at a surface rather than in the bulk because the pressure inside a bubble with a small volume can be substantially lower if the bubble forms in a depression in the surface. If a carbonation bubble of radius r forms in the bulk of the beverage, the surface tension $\sigma$ of the interface exerts an additional pressure of $(2\sigma/r)$ on the gas inside the bubble. Therefore, the minimum nucleation radius $r_{nuc-bulk}$ of bubbles in the bulk is $(2\sigma/P)$, where P is the partial pressure of carbon dioxide in the carbonated beverage, since for bubbles with a radius smaller than $(2\sigma/P)$ the pressure inside the bubble drives the carbon dioxide back into solution. However, if a bubble nucleates in a pit or groove, such as the cylindrical pit of radius r shown in cross-section in FIG. 5 of U.S. Pat. No. 6,319,535, the minimum size and shape of a bubble is a spherical cap (i.e., a spherical section) with the radius of curvature r' of the bubble interface being $(r/\cos\theta)$, the apex of the cap having a height of $(r \sec\theta)(1-\sin\theta)$, and where $\theta$ is the contact angle between the side walls of the pit and the surface of the bubble. The beverage/bubble interface therefore exerts a pressure of $(2\pi\cos\theta/r)$ on the carbon dioxide inside the bubble, and the bubble can form in the pit if the radius r of the pit is greater than a minimum nucleation radius $r_{nuc-surf} = (2\sigma\cos\theta/P)$. The contact angle $\theta$ is a function of the liquid-solid, liquid-gas and solid-gas surface tensions, and for a particular confection $\theta$ may be determined by observation, preferably using a microscope or magnifying glass. The surface tension $\sigma$ for a water/carbon dioxide interface is approximately 80 dynes/cm, and $\theta$ is generally in the neighborhood of 45° for a confection in a carbonated beverage. Therefore, the volume of a bubble can be almost two orders of magnitude smaller if it nucleates on a surface instead of in the bulk. (It should also be noted that bubbles will tend to form where preexisting air pockets exist, since then the initial large fluctuations require create a nucleation are not required.)

Furthermore, U.S. Pat. No. 6,319,535 teaches that to promote a bubble population on the article having a large volume, which is termed the "bubble coverage," the confection should have a surface that is rough on length scales on the order of $(2\sigma \cos \theta/P)$ to promote bubble nucleation. U.S. Pat. No. 6,319,535 teaches that if P is three atmospheres, i.e., approximately $3\times10^6$ dynes/cm$^2$, then $r_{nuc-surf}$ is approximately 40 microns. However, U.S. Pat. No. 6,319,535 does not teach or in any way suggest how a manufacturing process can create roughness on that length scale. Nor does U.S. Pat. No. 6,319,535 discuss a distribution in the sizes of pits on the surface or advantages thereof. Nor does U.S. Pat. No. 6,319,535 teach or in any way suggest creating surfaces which have interspersed rough and smooth portions, much less any advantages associated with such surfaces.

As noted in column 16, lines 12-27 of U.S. Pat. No. 6,319,535 and in paragraph of US Patent Publication 2003/0232117, it should be understood that to determine the smoothness of a surface it is not enough to simply measure deviations in the height of a surface. Rather, a length along the surface must also be specified. For instance, a lake in a light wind is smooth on a length scale of miles (since a lake seen from far away is flat), yet rough on a length scale of the distance between the ripples, yet smooth on a length scale of a millimeter (since any square millimeter section is basically flat, although it may not be level). Therefore, if a surface portion of a confection is said to be smooth on a length scale of r, then height deviations on an r by r section of the surface are substantially smaller than r. And conversely, if a surface portion of a confection is said to be rough on a length scale of r, then height deviations on an r by r section of the surface are on the order of r.

As also noted in column 15, line 57 to column 16, line 5 of U.S. Pat. No. 6,319,535 and in paragraph of US Patent Publication 2003/0232117, if a bubble is growing on a rough surface there will be periods where the shape of the bubble and the region of contact between the bubble and the surface changes abruptly so as to maintain the value θ of the contact angle along the contour of contact between the bubble interface and the surface. During abrupt transitions the bubble is likely to break free from an upward-facing surface due to the buoyancy of the bubble. Therefore, a bubble (once nucleated) is most likely to grow to an upper-limit of bubble size at an arbitrary location when the surface on which it grows is smooth, i.e., the bubble population will have more bubbles with radii near an upper-limit bubble radius R* if the surface is smooth over length scales in the neighborhood of the upper-limit bubble radius R*. It should however be noted that U.S. Pat. No. 6,319,535 only considers surfaces which are homogeneously rough/smooth and does not consider the affects on the carbonation bubble population of a surface with interspersed smooth and rough regions.

U.S. Patent Publication No. US2003/0232117 A1 for "Confections that 'swim' in a carbonated beverage" also teaches edible confections which are thin and substantially planar, so that the conditions for ascension and descension are substantially independent of the dimensions of the confections other than their thickness. Paragraphs [0100] through [0112] of U.S. Patent Publication No. US2003/0232117 A1 teach that the confections are molded, in particular in starch molds, as thin sheets and then die cut.

It is therefore an object of the present invention to provide articles which reliably rise and fall in a carbonated beverage.

It is another object of the present invention to provide rising/falling articles having an attractive appearance.

It is another object of the present invention to provide rising/falling articles which are edible confections.

More particularly, it is another object of the present invention to provide rising/falling articles which are edible confections having a substantially spherical shape.

More particularly still, it is another object of the present invention to provide rising/falling articles which are spherical edible confections with no molding seam or flash.

It is another object of the present invention to provide rising/falling articles whose ascensions and descensions are relatively insensitive to small deviations in the dimensions, density or surface texture of the article, or the level of carbonation of the liquid.

It is another object of the present invention to provide rising/falling articles which effectively nucleate bubbles.

It is another object of the present invention to provide rising/falling articles which have numerous bubble nucleation sites.

It is another object of the present invention to provide rising/falling articles which retain large bubbles.

It is another object of the present invention to provide rising/falling articles which ascend and descend over a long time period.

Furthermore, it is an object of the present invention to provide rising/falling articles with surfaces interspersed with regions that promote nucleation of bubbles and regions which facilitate the growth of large bubbles.

More particularly, it is an object of the present invention to provide rising/falling articles where the distribution of regions that promote nucleation of bubbles and regions which facilitate the growth of large bubbles is relatively invariant over the entire surface of the confection.

It is another object of the present invention to provide rising/falling articles with surfaces with interspersed rough regions and smooth regions.

It is another object of the present invention to provide an article where entrapped air bubbles are homogeneously distributed in the interior of the article.

More particularly, it is an object of the present invention to provide an edible confection with homogeneously distributed entrapped air bubbles which is translucent.

Furthermore, it is an object of the present invention to accomplish the above-listed objects when the article is an edible confection.

Furthermore, it is an object of the present invention to accomplish the above-listed objects when the article contains a gelling agent.

Furthermore, it is an object of the present invention to accomplish the above-listed objects when the article is a gummi candy.

Furthermore, it is an object of the present invention to provide gummi candies with kinetic properties in a carbonated beverage which are small enough to pass through a drinking straw so as to provide additional entertainment possibilities.

Furthermore, it is an object of the present invention to provide equipment and processes for manufacturing rising/falling articles or confections as per the objects above.

It is another object of the present invention to provide a means for manufacturing gummi candies which does not utilize molds, including but not limited to starch molds, silicon molds, etc.

It is another object of the present invention to provide a means for manufacturing gummi candies which does not utilize stamping, die cutting, or extrusion.

Additional objects and advantages of the invention will be set forth in the description which follows, and will be obvious from the description or may be learned by practice of the invention. The objects and advantages of the invention may be realized and obtained by means of the instrumentalities and combinations particularly pointed out in the claims.

BRIEF DESCRIPTION OF DRAWINGS

The accompanying figures, which are incorporated in and form a part of this specification, illustrate embodiments of the invention and, together with the description given above and the detailed description of the preferred embodiments given below, serve to explain the principles of the invention.

DETAILED DESCRIPTION OF THE PREFERRED EMBODIMENTS

The edible confections of the present invention repeatedly rise and sink in a carbonated beverage due to changing buoyancy resulting from the time-varying population of carbonation bubbles on the surface of the confection. The present invention includes methods of production, equipment used for production, and the confections themselves. Gelatin-based "gummi" (or "gummy") confections are preferred because their low solubility provides the advantages that (i) the dimensions of the confections and their surface properties are then relatively invariant with time when submerged, and (ii) the submerged confections have little effect on the appearance and the level of carbonation of the beverage. According to the present invention, the confections are translucent, substantially spherical, and seamless so as to have an attractive appearance.

The confections are preferably small—preferably 4 to 9 mm, and more preferably 5 to 7 mm in diameter—so that a large number of them can be in motion simultaneously without interfering with each other. Furthermore, confections having a diameter less than the diameter of a drinking straw allows an element of play to be involved where the drinker of the beverage can attempt to capture the "moving targets" of rising/falling confections by sucking them up in the straw. This could also provide a gaming element to the invention where multiple players with straws can compete to see who can capture the most swimming confections from within either a single glass or from separate glasses.

As discussed above, the rising/falling motions of a confection are dependent on the specific gravity of the confection as well as its surface properties. Surfaces which are rough on small length scales (e.g., length scales on the order of 5 µm or less) best nucleate carbonation bubbles and, conversely, surfaces which are smooth on small length scales do not nucleate carbonation bubbles well. As also noted above, surfaces which are smooth on intermediate length scales (e.g., length scales on the order of 25 µm or more) best retain carbonation bubbles and, conversely, surfaces which are rough on intermediate length scales do not retain carbonation bubbles well. According to the present invention, the surface of a confection has rough areas interspersed with smooth areas so that the surface as a whole functions to provide a bubble population which has considerable buoyancy by nucleating carbonation bubbles well and retaining carbonation bubbles well. Furthermore, the present invention is directed to processes for manufacturing confections having these surface properties, and particularly for processes where the entirety of the surface of each confection has these surface properties.

In particular, the present invention teaches a method for cold oil spherification of aerated candies where the particulars of the aeration and the cold oil spherification produce confections which have the above-described properties. The aeration process is performed as described below to produce a desirable population of internal bubbles (and hence a reduced specific gravity), and the conditions of cold oil spherification are chosen so that the internal bubbles affect the surface of a confection to provide desirable surface properties as described herein. The particulars of the cold oil spherification and the aerated gelling droplet are chosen so that the surface of the gelled aerated droplet has rough areas interspersed with smooth areas so that the surface as a whole functions to provide considerable buoyancy by nucleating carbonation bubbles well and retaining carbonation bubbles well. It should be noted that the production processes described herein produce and/or modify bubble populations that must be described in terms of distributions, i.e., the processes are inherently statistical. It is intended that the preferred average values and the preferred ranges of preferred average values provide confections with good rising/falling "activity," i.e., the preferred values or ranges of values provide confections which tend to be in motion when submerged in a carbonated beverage, rather than having long periods of stasis at the top or the bottom of the carbonated beverage.

Reference will now be made in detail to preferred embodiments of the confections of the present invention and the physical principles underlying the swimming of the confections in a carbonated beverage. While the invention will be described in conjunction with the preferred embodiments and underlying physical principles, it should be understood that these descriptions are not intended to limit the invention to the described embodiments, and the accuracy of the description of the underlying physical principles and the approximations made in the analysis of the physical principles are not intended to limit the scope of the invention. On the contrary, the invention is intended to cover alternatives, modifications and equivalents which may be included within the spirit and scope of the invention as defined by the appended Claims and their equivalents.

Figure 1:
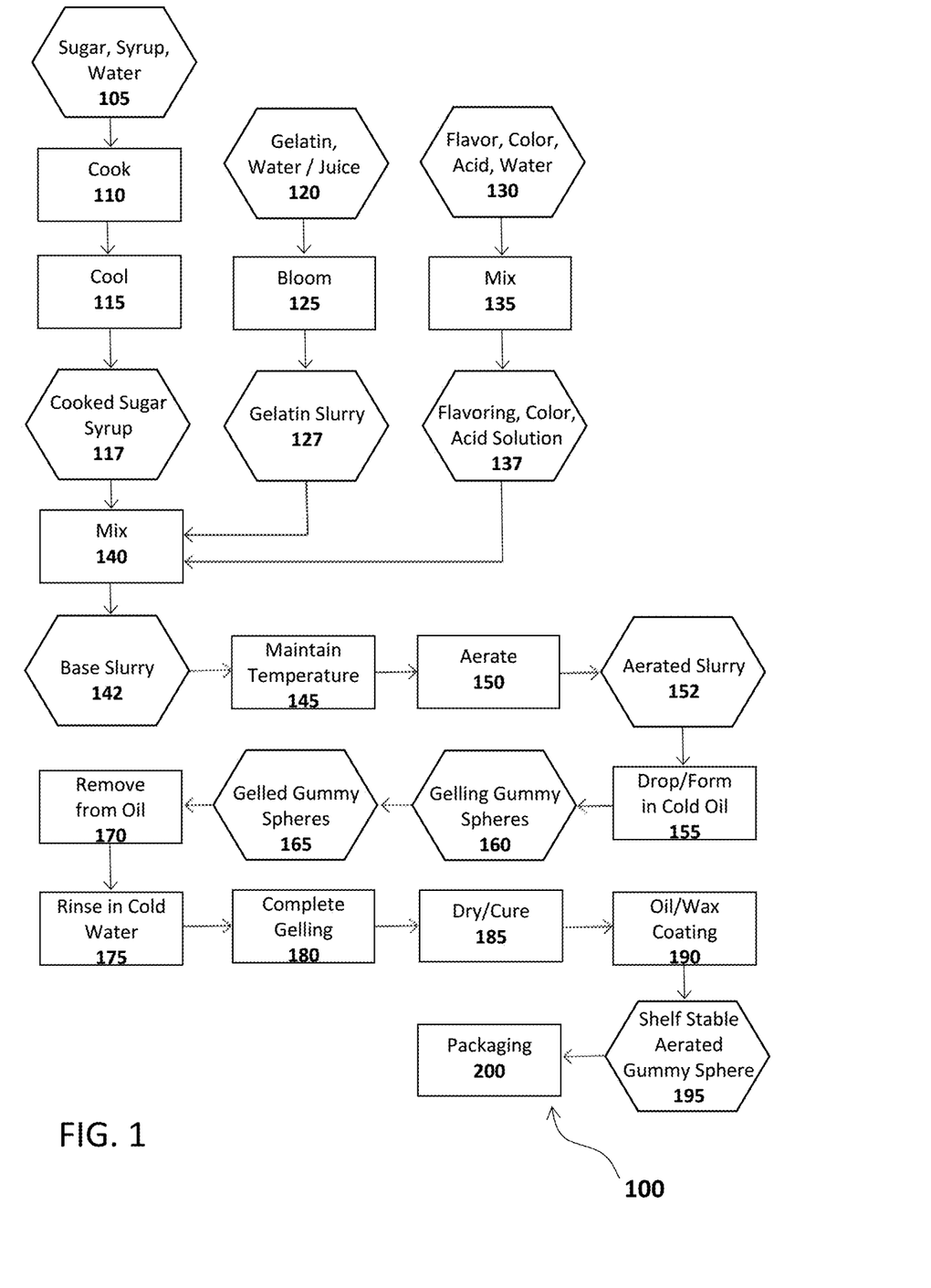
FIG. 1 is a flowchart of a production process according to a preferred embodiment of the present invention.

An exemplary process (100) for producing the confections of the present invention is shown in FIG. 1. The key features of the confections and the ingredients in the course of the production of the confections are physical characteristics including viscosity, surface tension, solubility, transluscence, specific gravity, and surface properties as they influence the formation and retention of the population of carbonation bubbles which form on the confection when submerged in a carbonated beverage. It should be noted that there are many possible variations in the ingredients and processes used to create a candy slurry which could be used to create the confections of the present invention. According to a preferred embodiment, the confections are "gummy" or "gummi" candies, such as those manufactured by Haribo of Bonn, Germany or Trolli of Wilkes Barre, Pennsylvania (although the confections of the present invention substantially different surface properties and specific gravity from standard gummi candies, as is described in detail herein).

In FIG. 1, process steps are depicted as rectangular boxes and physical components are listed in hexagonal boxes. (It should be noted that for the physical components which are depicted in FIG. 1, not all modifications or intermediate states of the physical components are explicitly depicted.) A 250-bloom gelatin in granulated or sheet form is combined with water or juice (120) at a temperature of roughly 5° C. and left for approximately half an hour to "bloom" (125) the gelatin. The step of blooming (125) is necessary to ensure a smooth texture in the finished product. Also, flavorings, colorings, acid (such as citric acid), a humectant such as sorbitol, and water (130) are mixed together (135) to provide a flavoring/colorings/acid solution (137). Also, sugar, syrup (such as corn syrup), and water (105) are mixed together and cooked (110) at a temperature of 115° C. to 121° C and then cooled (115) to 99° C. to 104° C. to provide a cooked sugar syrup (117). The cooked sugar syrup (117) is mixed (140) until smooth with the gelatin slurry (127) and the flavorings/colorings/acid solution to form a base slurry (142). (It should be noted that in conventional gummi manufacturing processes, at this point the base slurry (142) is subjected to near-zero atmospheric pressure in the vacuum chamber to lower the temperature of the mixture, draw off a portion of the water content, and remove any air bubbles entrapped in the slurry.)

Other types of syrup may be used, including but not limited to: rice syrup, tapioca syrup, glucose syrup, honey, high fructose corn syrup, invert sugar, dextrose and maltose. Furthermore, other humectants may be used instead of or in addition to sorbitol, including but not limited to: maltitol, dextrose, modified food starch, pectin or other starches and syrups. It should also be noted that pectin and some starches may serve multiple purposes by acting as both a humectant and also assisting in the gelling of the slurry (142). Similarly, maltitol, dextrose, and other starches and syrups may act as both a humectant and a sugar.

Figure 2:
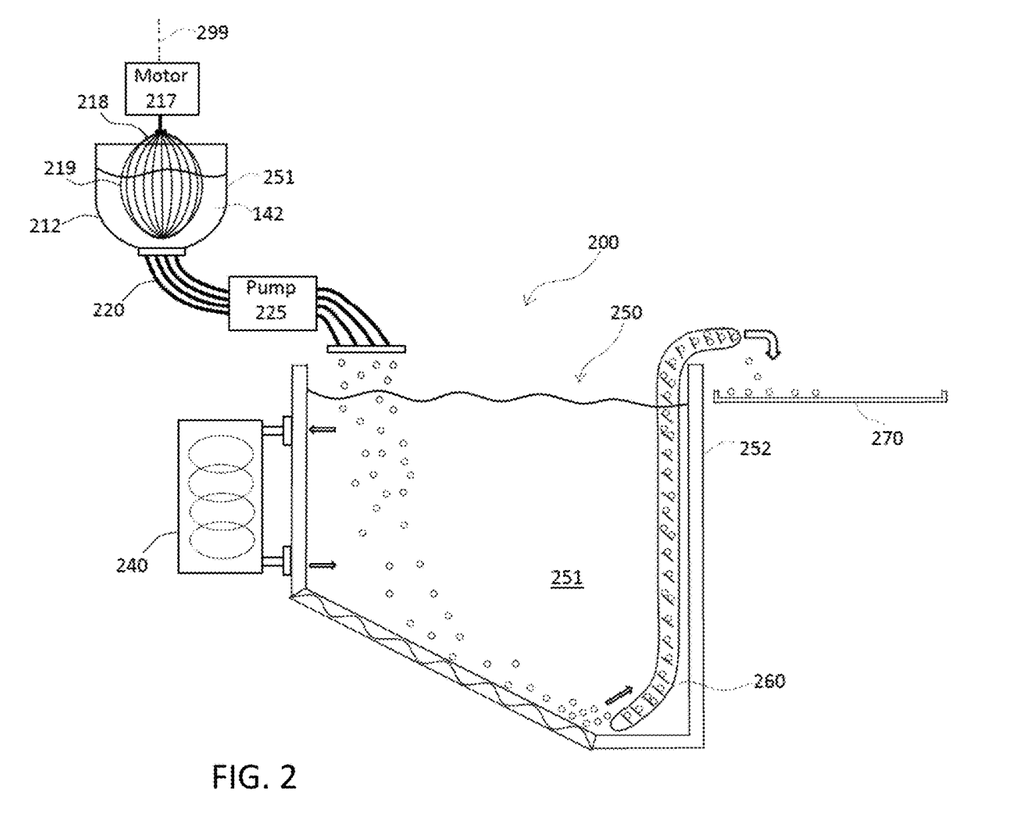
FIG. 2 is a schematic drawing of production equipment according to a preferred embodiment of the present invention.

The temperature of the base slurry (142) is then maintained (145) at 49° C. to 60° C. while the mixture (142) is aerated (150). FIG. 2 is a schematic representation of equipment (200) according to a preferred embodiment of the present invention used for the aeration step (150) and a few of the subsequent steps in manufacturing of confections according to a preferred embodiment of the present invention. The mixture (142) is mixed in a vat (210) by a whisk (219) driven by a motor (217). The whisk (219) has a plurality of elongated arms (218) (for clarity only a few of the arms are labeled with reference numeral 218) which extend downwards into the mixture (142), and the motor (217) produces rotation of the whisk (218) about a centrally-located vertical axis (299). The arms have a characteristic cross-sectional width D, are located a characteristic distance R from the axis of rotation, and the motor drives the whisker (218) with an angular velocity ω to provide the arms (218) with a characteristic velocity V equal to ($2\pi\omega R$). The characteristic cross-sectional width D, characteristic distance R, and characteristic velocity V are selected based on properties of the base slurry (142) (such as the viscosity n and the specific gravity p) to provide a population of internal bubbles in the aerated candy slurry (152) which will provide a confection with the preferred bulk and surface characteristics described herein. Preferably, the characteristic cross-sectional width D of the arms (218) is between 1 mm and 5 mm, the characteristic velocity V is between 3 m/s and 100 m/s, and the base slurry (142) has a specific gravity of between 1.1 g/cc and 1.4 g/cc and a viscosity n during the whisking of between 200 to 1200 centipoise. More preferably, the characteristic cross-sectional width D of the arms (218) is between 1.5 mm and 4 mm, the characteristic velocity V is between 7 m/s and 65 m/s, and the base slurry (142) has a specific gravity of between 1.2 g/cc and 1.3 g/cc and a viscosity n during the whisking of between 400 to 800 centipoise. Still more preferably, the characteristic cross-sectional width D of the arms (218) is between 2 mm and 3 mm, the characteristic velocity V is between 14 m/s and 44 m/s, and the base slurry (142) has a specific gravity of between 1.2 g/cc and 1.3 g/cc and a viscosity n during the whisking of between 500 to 700 centipoise.

Once the population of internal bubbles in the aerated candy slurry (150) reaches the desired state, the aerated candy slurry (150) is pumped out of the vat (210) by a pump (225) via a plurality of tubes (220). Upon exiting the ends of the tubes (220), the aerated candy slurry (152) falls (155) into a cold oil bath (250), i.e., into a container which contains a cold oil (251). Inside the cold oil bath (250) the drops of aerated candy slurry (152) descend and cool and transition from a liquid to a gelling droplet (160) as viscosity increases with time, to a gelled sphere (165). According to the present invention, the rate of pumping, the distance the drops of aerated candy slurry (152) plummet (155) before hitting the cold oil (251) (i.e., the "plummet distance"), the temperature of the cold oil (251), and the viscosity of the cold oil are chosen so that the aerated candy slurry (152) solidifies into gelled spheres (165) with preferred surface characteristics as described herein.

The dropping of a slurry into a cold oil to form spheres is commonly referred to as cold oil spherification. It should be noted that forming gummi candies using cold oil spherification precludes the need for starch molds, thereby providing the advantage of circumventing all the process steps (and components) involved with starch molds, including cleaning the starch, reforming the starch into molds, cleaning the starch off the confections, etc. And significantly for an invention whose appeal has an aesthetic component, forming the confections without the use of molds provides the advantage that seam or flash lines on the confection are avoided, so the confections have an attractive substantially spherical appearance. Typically, seam and flash lines have a width on the order of a few tenths of a millimeter. In contrast, the cold oil spherification-formed confections of the present invention are smooth on a length scale of 0.1 mm. It should also be noted that if an aerated confection is molded, the internal bubbles will tend to rise to the top surface of the molded confection, causing surface imperfections or a change of color and therefore have an undesirable appearance. Therefore, the aeration will not be homogeneous, and the concentration of internal bubbles may be visible due to their concentration near the top surface of the confection.

Types of oil which are suitable for use in the preferred embodiment include but are not limited to canola oil, mineral oil, sunflower oil, and vegetable oil since these oils do not cloud or freeze at the temperatures needed. However, it should be noted that canola oil can become rancid and will have to be removed from the resulting candy, or alternatively an antioxidant may be added to the canola oil. Mineral oil is commonly used in coating commercial candies, but its cost can be prohibitive. Other oils such as olive oil and coconut oil freeze more easily at low temperatures and will cloud and become viscous at temperatures with the preferred temperature ranges. As a result, olive oil and coconut oil are not as preferable. However, olive oil and coconut oil may be utilized at the bottom of the container to further slow the speed of descent of the gelling spheres (160) so that they have sufficient time to gel before reaching the bottom of the container (252).

The gelled spheres (165) are removed from the oil (251) by a conveyor belt (260), rinsed (175) in cold water to remove surface oil (175), refrigerated (180) for 4-8 hours to complete the gelling process, cured (185) and coated with an oil or wax (190) to provide shelf stable confections (195) which can then be packaged (200).

Figure 3A:
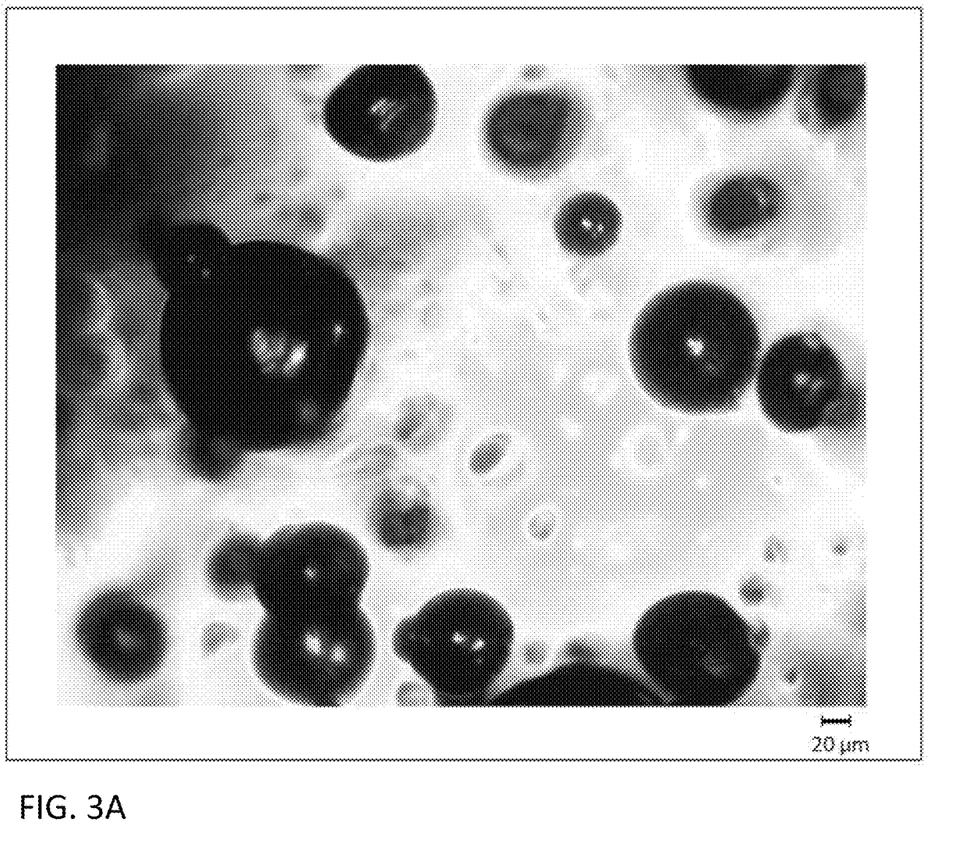
FIG. 3A is a magnified view of the surface of a planar cut through a confection manufactured according to a preferred embodiment of the present invention.
Figure 3B:
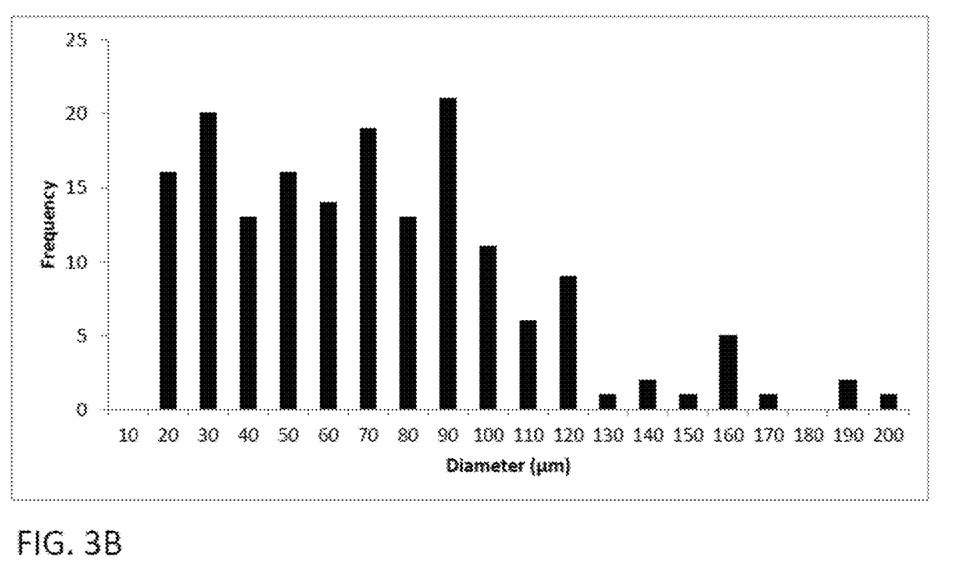
FIG. 3B is a frequency-size histogram for bubbles in planar cuts through confections manufactured according to a preferred embodiment of the present invention.

FIG. 3A shows a magnified view of the surface of a planar cut through a exemplary confection (195) manufactured according to a preferred embodiment of the present invention. FIG. 3B is a frequency-size histogram of the internal bubbles in the planar cuts of confections (195) manufactured according to a preferred embodiment of the present invention. As can be seen from FIG. 3B, the average diameter of the internal bubbles is around 70 to 80 µm. Preferably, in a planar cut there are between 2 and 30 internal bubbles per square millimeter, and the average bubble size of the internal bubbles is between 30 and 150 µm. More preferably, in a planar cut there are between 5 and 20 internal bubbles per square millimeter, and the average bubble size of the internal bubbles is between 50 and 100 µm. Still more preferably, in a planar cut there are between 10 and 15 internal bubbles per square millimeter, and the average bubble size of the internal bubbles is between 70 and 80 µm. The internal bubbles preferably reduce the specific gravity of the confection by between 5% and 25%, and more preferably between 10% and 20%.

Figure 3C:
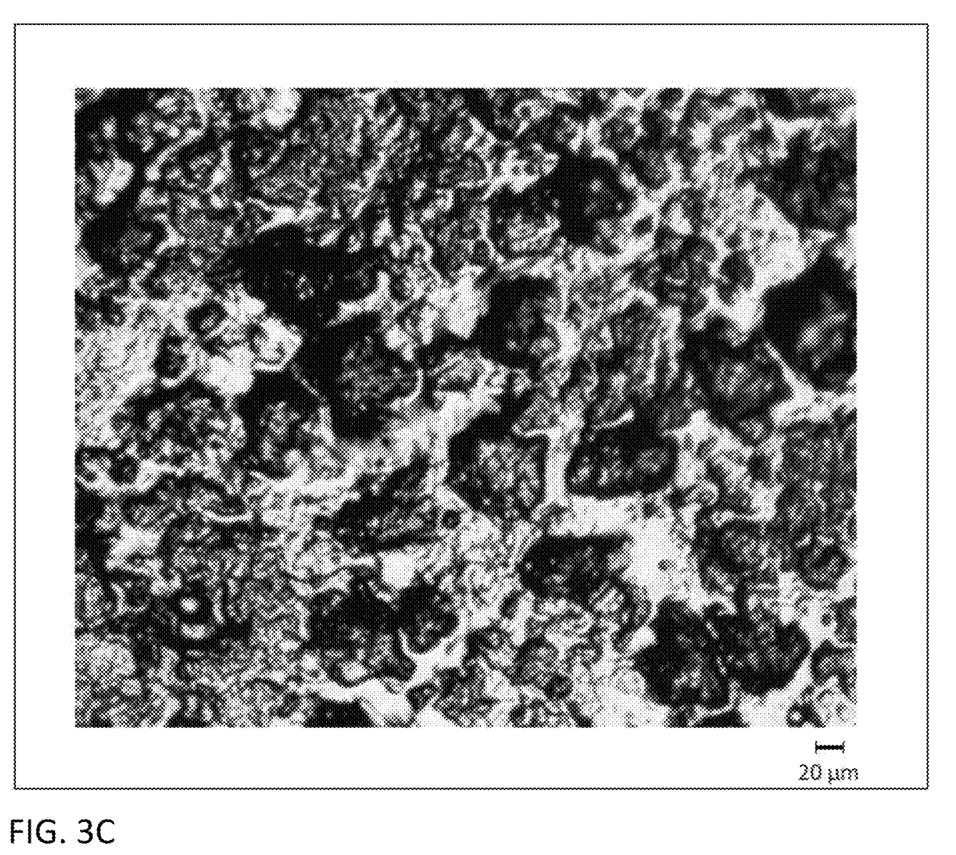
FIG. 3C is a magnified view of a surface of a confection manufactured according to a preferred embodiment of the present invention.

FIG. 3C is a magnified view of the surface of a gelled sphere according to the present invention showing interspersed rough and smooth surface regions. The interspersion of rough and smooth regions provides the advantage that the rough regions nucleate bubbles and the interspersed smooth regions allow bubbles to grow in size without dislodging, so that a bubble population providing good buoyancy can form on the surface of a confection. According to the present invention, preferably 40% and 90%, more preferably 50% to 85%, and still more preferably 60% to 80% of the overall surface of a confection (195) is rough when considered on a length scale of 5 µm. Furthermore, according to the present invention, the smooth regions have a characteristic length scale of 10 to 50 µm, more preferably 20 to 40 µm, and still more preferably 25 to 35 µm. And the rough regions have a characteristic length scale of 20 to 80 µm, more preferably 30 to 60 µm, and still more preferably 40 to 50 µm. (The characteristic length scales may be determined by two-dimensional Fourier analysis of the boundary lines between the smooth and rough regions.)

The temperature of the oil (251) must be sufficiently warm that the slurry droplet (160) will have time for the surface tension to cause the droplet to form a sphere, and must be sufficiently cold so that the slurry droplet (160) will be sufficiently gelled by the time it reaches the bottom of the container (252) of cold oil (251) that it will retain its spherical shape and not stick together with other slurry droplets at the bottom of the container (252). It is believed that bubbles inside the slurry droplet (160) which have recently escaped or are in the process of escaping from the slurry droplet (160) due the higher pressure inside the slurry droplet (160) caused by its surface tension cause the regions of roughness on the surface of the confection (195). It is further noted that there is a dependence of the character of the surface (such as relative amounts of area of surface roughness and smoothness) on the temperature of the aerated slurry (152) and the temperature of the oil (251). Preferably, the aerated slurry (152) has a temperature between 40° C. and 70° C., the oil (251) has a temperature between −10° C. and 5° C., and the plummet height is between 5 and 10 cm. More preferably, the aerated slurry (152) has a temperature between 50° C. and 60° C., the oil (251) has a temperature between −4° C. and −2° C., and the plummet height is between 6 and 8 cm.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable those skilled in the art to best utilize the invention and the various elements of the embodiments, alone or in any combination, with various modifications as are suited to the particular use contemplated. Many other variations are possible. For example: the liquid may be supersaturated with a gas other than carbon dioxide; the confections may not be translucent or transparent; the confections may not be spherical; the confection need not be gelatin-based; the bloom of the gelatin may be greater than or less than 250; the aeration may be produced by another process, such as vigorous shaking the candy slurry, stirring, or some other form of agitation, or by driving gas into the candy slurry using a high environmental pressure, or through a chemical means; the number of tubes through which the candy slurry is pumped may be more than or less than the numbers specified, and may even be a single tube; the dropper head, particularly if it feeds many droppers, may be pressurized to overcome the viscosity of the slurry; the oil may be any edible oil which will not cloud (i.e., approach freezing with the associated high viscosity) or solidify at the required temperature to producing cold-oil spherification; gelling agents may include but are not limited to gelatin, agar, pectin, starch or any combination thereof; gelled spheres can be removed from the oil by straining, auger, scooping, or any other means known to the art; faster setting gelling agents may be used; a combination of gelling agents may be used to produce a faster setting time; a combination of different oils may be used to provide a desired combination of viscosity and temperature; the oil may have a temperature gradient so as to have a warm upper region appropriate for the drop of slurry to form into a sphere and a colder region at the bottom to ensure proper setting; the ingredients may include vitamins, nutritional supplements, herbal additives, etc.; the confection can be produced batch-wise or through a continuous process; the gelatin slurry may be produced directly by dissolving gelatin in hot water and may include stirring to dissolve the gelatin; a sieve may be used to separate irregular-shaped or larger products; a sieve may be used to remove smaller droplets/particles that may have broken off from the main drops; an outlet tube may feed to a dropper head with many droppers; agar or pectin or a quick-setting gelatin can be combined with the gelatin base to decrease setting time; the confection need not be small enough to pass through a standard drinking straw; the plummet height can be greater than or less than that specified; whipping agents (particularly for gelling agents like agar) can be included to improve or aid in the ability of the gelling agent or confections ability to hold air bubbles, such whipping agents including but not being limited to gelatin, egg albumen, milk proteins, whey, soya protein, cellulose derivatives, etc.

Furthermore, the description of the physical principles underlying the operation and performance of the present invention are also presented for purposes of illustration and description, and are not intended to be exhaustive or limiting. It should be understood that these descriptions include many approximations, simplifications and assumptions to present the basic concepts in a mathematically tractable form, and some effects which influence the operation and performance are neglected for ease of presentation. For instance: the contact angle may not have the same value over the entire contour of contact, particularly on a rough or slanted surface; the surface tensions may change with time due to the confection or its coating dissolving in the beverage; the specific gravity of the carbonated beverage is not exactly unity, and the specific gravity will vary as the carbonation leaves the beverage and the confection and its coating dissolve; carbon dioxide gas has a nonzero specific gravity; the surface of a carbonation bubble is not exactly spherical due to such effects as gravity; the bubbles coverage as a function of time and the angle of orientation of the surface is to some extent dependent on the carbonation level of the beverage; the bubble sliding radius may have a dependency on the parameters of the system other than as described; the bubble coverage as a function of time and the angle of orientation of the surface is dependent on the length of time the confection has been in the beverage; the mechanism by which smooth and rough surface regions form on the spheres may be different than that described; etc. Accordingly, it is intended that the scope of the invention be determined not by the embodiments illustrated or the physical analyses motivating the illustrated embodiments, but rather by the appended Claims and their legal equivalents.

What is claimed is:

1. A method for making a confection with a final density and final surface characteristics such that said confection repeatedly rises and sinks when in a carbonated beverage due to a time-varying surface population of carbonation bubbles which forms on a surface of said confection to form a confection/bubbles ensemble having a time varying buoyancy, comprising the steps of:
   creating a base slurry,
   aerating the said base slurry to create an aerated slurry having a slurry internal population of bubbles,
   producing initial gelling of a portion of said aerated slurry by submerging said portion of said aerated slurry into a container of an oil at a gelling temperature to produce a gelled candy having a gelled internal population of bubbles and gelled surface characteristics affected by said slurry internal population of bubbles near the outer surface of said portion of said aerated slurry during said initial gelling, and subsequent processing of said gelled candy to produce said confection having said final surface characteristics and a final internal population of internal bubbles which provides said final density.

2. The method of claim 1 wherein said aerating is performed by whisking said base slurry with a whisker having elongated arms of a characteristic cross-sectional width which, during said whisking, extend substantially vertically into said base slurry and rotate about a central, substantially vertical, axis of rotation such that said elongated arms have a characteristic velocity, said characteristic cross-sectional width of said elongated arms is between 1 mm and 5 mm, said characteristic velocity is between 3 m/s and 100 m/s, and said base slurry has a viscosity during said whisking of between 200 to 1200 centipoise.

3. The method of claim 2 wherein said characteristic cross-sectional width of said elongated arms is between 1.5 mm and 4 mm, said characteristic velocity is between 7 m/s and 65 m/s, and said base slurry has a viscosity during said whisking of between 400 to 800 centipoise.

4. The method of claim 2 wherein said characteristic cross-sectional width of said elongated arms is between 2 mm and 3 mm, said characteristic velocity is between 14 m/s and 44 m/s, and said base slurry has a viscosity during said whisking of between 500 to 700 centipoise.

5. The method of claim 1 wherein said base slurry includes a gelling agent.

6. The method of claim 1 wherein said subsequent processing includes the steps of removing said gelled candy from said container of said oil, removing said oil from the surface of said gelled candy, curing said gelled candy to remove internal moisture to produce a shelf-stable gelled candy, and coating said cured gelled candy to improve shelf stability.

7. The method of claim 1 wherein said submerging is performed by dropping a droplet of said aerated slurry into said oil from a plummet height and allowing said droplet to descend a distance in said oil so that said gelled candy has a substantially spherical shape.

8. The method of claim 7 wherein said aerated slurry prior to said submerging into said oil has a temperature between 40° C. and 70° C., said gelling temperature is between −10° C. and 5° C., and wherein said plummet height between 5 and 10 cm.

9. The method of claim 8 wherein said aerated slurry prior to said submersion in said oil has a temperature between 50° C. and 60° C., said gelling temperature is between −4° C. and −2° ° C., and said plummet height is between 6 cm and 8 cm.

10. The method of claim 7 wherein said spherical shape has a diameter between 5 mm and 7 mm.

11. The method of claim 7 wherein said spherical shape has a diameter of less than 7 mm.

12. The method of claim 7 wherein said gelled candy has small-scale surface characteristics including small-scale smooth surface portions promoting carbonation bubble retention and small-scale rough surface portions promoting carbonation bubble nucleation, said small-scale smooth surface portions being smooth when considered at a length scale of 5 µm and said small-scale rough surface portions being rough when considered at a length scale of 5 µm, said small-scale rough portions covering between 40% and 90% of the overall surface of said gelled candy.

13. The method of claim 12 wherein said small-scale rough portions cover between 50% and 85% of the overall surface of said gelled candy.

14. The method of claim 12 wherein said small-scale rough portions cover between 60% and 80% of the overall surface of said gelled candy.

15. The method of claim 12 wherein said small-scale rough portions have a characteristic length scale of 20 to 80 µm.

16. The method of claim 12 wherein said small-scale rough portions have a characteristic length scale of 30 to 60 µm.

17. The method of claim 12 wherein said small-scale rough portions have a characteristic length scale of 40 to 50 µm.

18. The method of claim 1 wherein said aerating of said base slurry is produced by agitation of said base slurry.

19. The method of claim 1 wherein said aerating of said base slurry is produced by driving gas into said base slurry via a high environmental pressure.

20. The method of claim 1 wherein said aerating of said base slurry is produced by driving gas into said base slurry via chemical means.

21. The method of claim 1 wherein said gelled internal population of bubbles produces a reduction in said final density of said gelled candy of 5% to 25%.

22. The method of claim 1 wherein said gelled internal population of bubbles produces a reduction in said final density of said gelled candy of 10% to 20%.

23. The method of claim 1 wherein a specific gravity of said aerated slurry is between 1.1 and 1.4 g/cc.

24. The method of claim 1 wherein a specific gravity of said aerated slurry is between 1.2 and 1.3 g/cc.

* * * * *